United States Patent

[11] 3,572,021

| [72] | Inventor | Samuel A. McDonald |
| | | 626 S. Banana River Drive, Merritt Island, Fla. 32952 |
| [21] | Appl. No. | 861,920 |
| [22] | Filed | Sept. 29, 1969 |
| [45] | Patented | Mar. 23, 1971 |

[54] FRUIT PICKER
18 Claims, 9 Drawing Figs.

| [52] | U.S. Cl. | 56/334 |
| [51] | Int. Cl. | A01g 19/08 |
| [50] | Field of Search | 56/332, 333, 334, 335, 336 |

[56] References Cited
UNITED STATES PATENTS

| 2,475,687 | 7/1949 | Baker | 56/333 |
| 2,661,587 | 12/1953 | Bullock | 56/334 |
| 2,990,669 | 7/1961 | Klemm | 56/334 |
| 3,474,613 | 3/1968 | McDonald | 56/334 |

*Primary Examiner*—Antonio F. Guida
*Attorneys*—Keith Misegades and George R. Douglas, Jr ABSTRACT: An electrically actuated, stem severing fruit picker including an elongated tube, having a handle on one end, and a pair of pivoting cutting jaws on the other end, and a fruit contact switch wired to a solenoid system for activating the cutting jaws. A circuit breaker is included to unjam the cutting jaws, should the fruit stem remain unsevered after the first cutting attempt, which causes repeated closing and opening of the jaws until the fruit stem is severed. The noncutting edges of the cutting jaws are recessed, thereby allowing perfect mating of the cutting portions. Segments of the jaw cutting edges are flattened for more perfect cutting of the fruit stem. A control rod is secured to the jaws and the electrical actuation system, and the laws may be arranged so that either an upward or downward movement of the control rod will cause the cutting jaws to close. The tube includes means for selectively retaining releasing severed fruit therefrom.

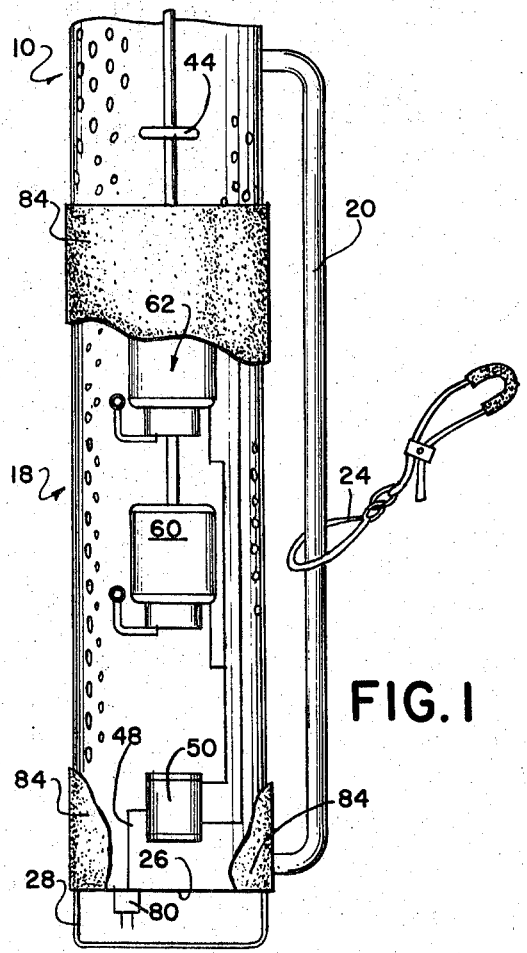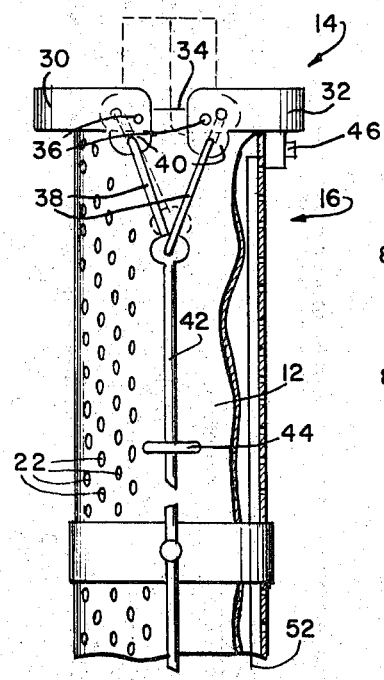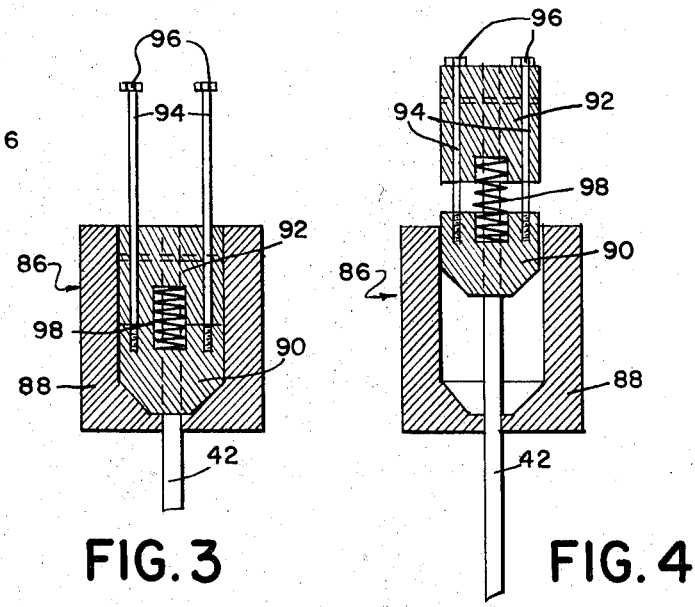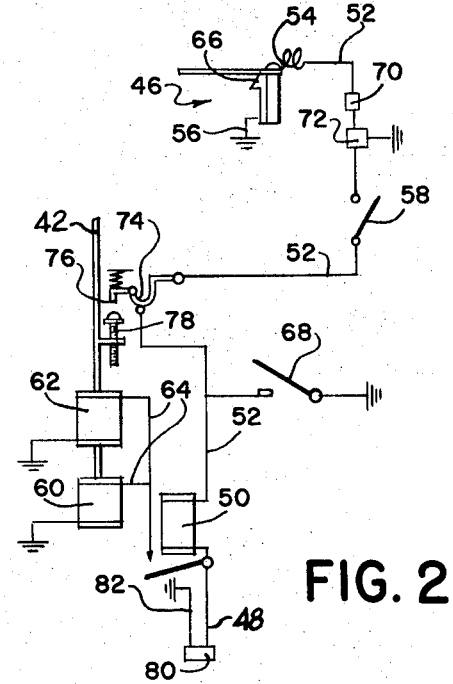
PATENTED MAR 23 1971
3,572,021
SHEET 1 OF 2
FIG. 1
FIG. 2
FIG. 3
FIG. 4
INVENTOR
SAMUEL A. McDONALD
BY Keith Misegades
Misegades & Douglas
ATTORNEYS

FRUIT PICKER

CROSS-REFERENCE TO RELATED PATENT

The invention disclosed and claimed herein comprises improvements to the invention disclosed and claimed in my prior U.S. Pat. No. 3,374,613, issued Mar. 26, 1968.

BACKGROUND OF THE INVENTION

Although not limited to the citrus fruit industry, the need for a simple and reliable fruit picker in this particular branch of agriculture has become particularly acute in recent years, where a large and inexpensive labor force is no longer available. To make citrus fruit economically marketable, it is now necessary that one man be able to perform the work of 10 or more.

As since the dawn of written history, an individual's output is increased by providing him with a labor saving device. In this instance, the device provided is a portable, mechanical fruit picker. There are a number of such devices, the most satisfactory to date being the instant invention and that disclosed in my prior U.S. Pat. No. 3,374,613.

U.S. Pat. No. 2,475,687, dated Jul. 12, 1949, and issued to Reuben C. Baker, discloses a fruit picker having a tube with a fruit triggered release to actuate a pair of spring-loaded, semicircular jaws to sever the fruit stem. The principal disadvantage of this device is that it must be mechanically reloaded each time a single fruit is picked. U.S. Pat. No. 2,990,669, issued to Arthur R. Klemm, Jr., improves the Baker concept by providing a powered device for severing the fruit stem, but the source of power is a pneumatic system which reduces the portability of the invention.

U.S. Pat. No. 3,165,880 issued to Archie P. Buie, Jr., is another improvement, involving an elongated tube for receiving the severed fruit, and a pivoting knife for severing the fruit stem, actuated by a fruit contact switch. However, the portability of the device is highly dubious; a pivoting knife does not provide positive severance of the fruit from its stem, and pneumatic means are required to suck the severed fruit into the tube to a collection point.

Further development in the art has not been entirely satisfactory. For example, U.S. Pat. No. 3,199,280 issued to Chester N. Wilczek shows a pivoting jaw for breaking, rather than cutting, the fruit stem, actuated mechanically by a thumb switch to drop fruit into a pole supported bag. Obviously, the bag is clumsy to handle, and no powered assistance is provided for picking the fruit. The same deficiencies are noted in the U.S. Pat. No. 3,365,870, issued to Salvatore Cardinale wherein the fruit must be seized and twisted to break the stem. A later U.S. Pat. No. 3,387,444 issued to Ljubomir Krdzic suffers similar drawbacks.

On the other hand, the instant invention provides a completely automatic and portable fruit picker, easily operable by a single individual. The precise picking operation may be automatic, whereby a fruit stem severing mechanism is actuated by contact of the fruit with an activating switch, or the severing mechanism may be activated by the operator. In the automatic operation, an unjamming system is provided to repeatedly and cyclically operate the severing mechanism should the fruit stem be stubborn. The invention is electrically powered, power being supplied to a mechanical operating rod which operates the severing mechanism, the rod being moved by a novel dual core solenoid.

SUMMARY OF THE INVENTION

The instant invention involves improvements to the basic automatic fruit picker shown, described and claimed in my prior U.S. Pat. No. 3,374,613, and includes an electrical unjamming system for a tube type fruit picker, having an electrically actuated fruit stem severing mechanism at one end, which comprises a circuit breaker for repeatedly actuating the severing mechanism until the fruit stem is completely cut. The second basic improvement is the provision of a single winding, dual core solenoid to activate an operating rod which controls the severing mechanism. Other improvements claimed include an override actuation switch for the severing mechanism, a safety switch to render the invention inoperable when not in use, and transistorization of the electrical circuit of the invention to prolong contact life. The severing mechanism includes a pair of semicircular pivoting jaws having flattened, mating portions for better stem contact, and having their nonsevering portions recessed from the cutting edges to prevent jamming. A fruit contact switch is provided to activate the severing system automatically. The tube portion of the invention may be in sections for easy breakdown and storage, and the interior of the tube may be lined with resilient material to prevent bruising of the picked fruit. The tube may be configured to selectively store and discharge picked fruit through provision of a baffle assembly in the lower part thereof.

BRIEF DESCRIPTION OF THE DRAWINGS

Details of construction and operation of the invention will become apparent by reference to the following drawings wherein:

FIG. 1 is a sectional, side view of the invention with parts broken away to show interior detail;

FIG. 2 is an electrical wiring diagram for the invention;

FIGS. 3 and 4 are views of the novel two core, single winding solenoid of the invention, showing the solenoid energized and deenergized, respectively;

DESCRIPTION OF THE PREFERRED EMBODIMENTS

Figure 8:
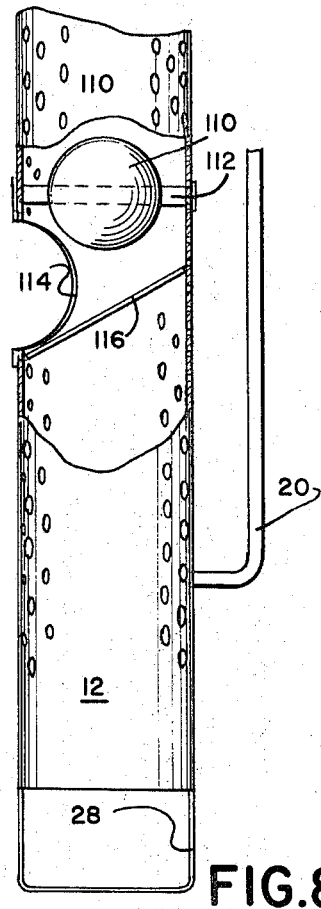
FIGS. 8 and 9 are partial plan views of the invention, showing alternative embodiments of the novel fruit storage and discharge baffle assembly.

Referring now to the drawings by reference character, the improved fruit picker 10 is shown comprising an elongated tube 12 having a fruit severing mechanism 14, an electrical actuation system 18, and a carrying handle 20 for the operator. Preferably, tube 12 will be constructed of lightweight materials, such as aluminum or one of a variety of lightweight plastics, and may have its sidewalls provided with numerous bores 22 to reduce weight even further. If desired, the interior walls of tube 12 may be lined with cushion material to act as a shock absorber and prevent bruising of the picked fruit as it falls, interiorally of tube 12 (not shown). Handle 20 may include a padded shoulder strap 24, for ease in manipulating the invention when in use, and the rear, or fruit exit end 26 of tube 12 may have a padded bumper handle 28 secured thereon to slow the exit of picked fruit from tube 12 without bruising the fruit. Additionally, tube 12 may be in two or more separable sections, for ease of storage when not in use.

Severing mechanism 14 includes a pair of semicylindrical jaws 30, 32, pivotally mounted to fruit entrance end 34, of tube 12, at 36, which approximates a diameter of tube 12. Mechanical linkage 16 comprises a pair of tie rods 38, 38, connecting ear extensions 40, 40 of jaws 30, 32, to an operating rod 42, which is mounted exteriorly on tube 12, substantially parallel to the long axis thereof; and is retained thereon by a plurality of sleeve guides 44, 44. In the sense of FIG. 1, rod 42 moves upwardly to close jaws 30, 32, as indicated by solid lines. A finger switch 46 (FIGS. 2 and 7) is mounted interiorly of tube end 34 and, upon depression thereof by an individual fruit entering the tube, the electrical system 18 of the invention is activated, in a manner to be explained below, thereby moving rod 42 downwardly (FIG. 1) to close jaws 30, 32, through the linkage provided by tie rods 38, 38, and sever the stem of the fruit.

A wiring diagram of electrical system 18 is illustrated in FIG. 2. Hot line 48 from an external power source is connected to a terminal on a relay switch 50. Lead line 52 connects the other post of relay 50 to post 54 on finger contact switch 46, which is grounded at 56. Line 52 is interrupted by a manual safety switch 58. A pair of solenoids 60, 62 are wired in parallel, and are energized from relay 50 through wires 64, 64. This portion of the invention, including details of finger switch 46, is more completely explained in my prior U.S. Pat. No. 3,374,613. At any rate, upon depression of finger switch 46, contact 66 thereof is closed, thereby energizing relay 50 and solenoids 60, 62, to move rod 42 and close jaws 30, 32, to sever the fruit stem.

In the event the jaws are to be operated independently of finger switch 46, a manual override switch 68 may be used. Switch 68 may be of the pushbutton variety. Manual safety switch 58 may be supplemented by a gravity operated mercury switch 70, which will be positioned to prevent closing of jaws 30, 32 when tube 12 is in a substantially horizontal, nonoperative position. Finally, electrical system 16 may include a standard, transistorized silicon control rectifier 72, which will prolong the life of finger switch 46 and improve energy delivery to solenoids 60 and 62. Of course, independently of the instant invention, both mercury switch 70 and rectifier 72 are standard electrical shop shelf items.

The automatic unjamming system of the invention comprises a circuit breaker 74, wired in lead line 52. Contact 76 thereon is spring biased to a normally "on" position. Actuator 78 is threaded to an ear formed in rod 42, and is adjustable parallel therewith. Assume contact 66 of finger switch 46 is being depressed by a fruit to be severed. Solenoids 60, 62 are activated by relay 50, thus moving control rod 42 upwardly, in the sense of FIG. 2. As control rod 42 approaches the end of its stroke, as jaws 30, 32 close, relay 50 will be deactivated by actuator 78, which opens circuit breaker 74 and thereby opens lead line 52 from relay 48 to finger switch 46. However, jaws 30, 32 will close completely, due to the momentum of rod 42 and the cores of the solenoids 60, 62, such momentum being initially imparted by the energization of solenoids 60, 62. Should the fruit stem remain unsevered, contact 66 of finger switch 46 will remain closed. Thus, as rod 42 returns to its initial position, actuator 78 will no longer abut circuit breaker 74, and lead line 52 will thus energize relay 50 again. This will energize solenoids 60, 62 thereby moving rod 42 upwardly to close jaws 30, 32. Should the fruit stem continue to remain unsevered, the cycle will repeat again, until the stem is cut, so that the severed fruit may pass finger switch 46 to open contact 66 and prevent circuit breaker 74 from activating the system.

A standard outlet plug 80, which receives ground line 82 and hot line 48, is mounted at the rear of tube 12 so that a standard electrical extension cord (not shown) may be used to connect the invention to a suitable source of electrical energy. Of course, electrical energy could also be provided by a portable generator or battery pack (not shown).

Figure 9:
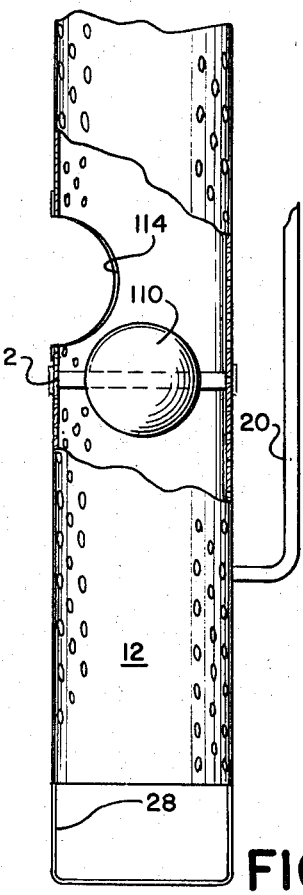

Ordinarily the electrical system 18 will mounted exteriorily of tube 12, and thus a shroud 84, partially illustrated in FIG. 1, should be provided as weather protection. Alternatively, if the fruit discharge construction illustrated in FIGS. 8 or 9 is used, electrical system 18 may be mounted internally of tube 12, at the lower portion thereof.

Turning now to FIGS. 3 and 4, a novel, dual core, single winding solenoid 86 is illustrated, which may be used in place of the dual solenoids 60 and 62. A single solenoid will not have a stroke distance sufficient to move operating rod 42 to completely close jaws 30, 32. Thus, sequentially energized solenoids 60, 62, which are completely explained in my prior U.S. Pat. 3,374,613, should be used, or the novel solenoid 86 may be employed.

Solenoid 86 includes a single winding 88, a primary core 90, and a secondary core 92. Secondary core 92 is rigidly attached to rod 42 while primary core 90 is centrally bored, and is slidable along rod 42. As shown in FIG. 4, core 90 will be within the field of force of winding 88 when solenoid 86 is energized, but core 92 will not be. Upon energizing winding 88, core 90 is drawn from the position indicated in FIG. 3. During this movement, secondary core 92 will be drawn into the field of force of winding 88 by means of connecting rods 94, 94, rigidly threaded to core 90, but slidably mounted through core 92, and having abutments 96, 96, formed at their distal ends. Rod 42 will also be moved by the movement of core 90 because of the rigid interconnection of rod 42 and secondary core 92.

Once secondary core 92 is drawn into the field of force of winding 88, it will move to the position indicated in FIG. 3, thereby also moving rod 42 a sufficient distance to close jaws 30, 32. When solenoid 86 is deenergized, coil spring 98, interposed between cores 90, 92, assists in returning rod 42 and jaws 30, 32 to an open, nonoperative position.

Figure 7:
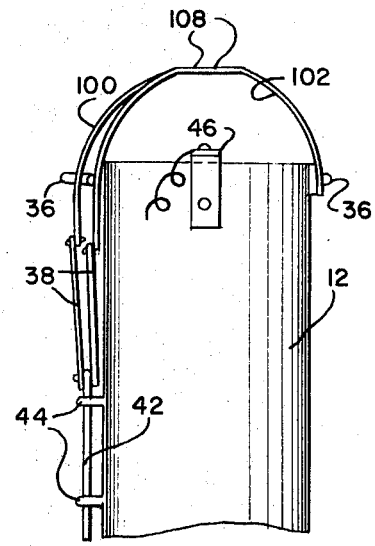
FIG. 7 is an end view of the invention as shown in FIG. 5.
Figure 6:
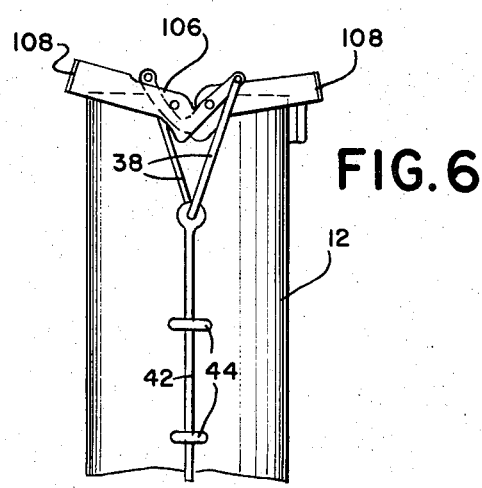
FIGS. 5 and 6 are partial plan views of the novel severing mechanism and mechanical linking therefore, showing the unit in operative and rest positions, respectively.
Figure 5:
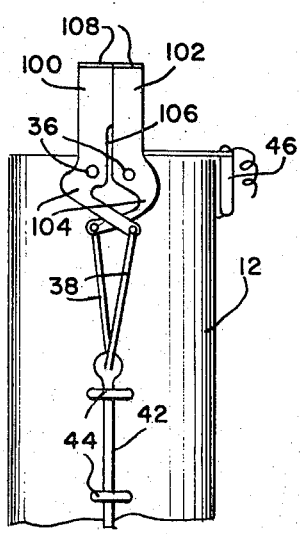

An alternative jaw arrangement is illustrated in FIGS. 5—7. Jaws 100, 102 are pivotally mounted at 36, but each ear 104, comparable to ears 40 of jaws 30, 32, is inversely formed so that a pull, or downward movement on rod 42 causes jaws 100, 102 to close, and an upward movement of rod 42 causes jaws 100, 102 to open. Additionally, the unsharpened portion 106 of jaw 100 is recessed away from the mating portion of jaw 102 so that should other stems or foliage find its way into the fruit picker, it will not be harmed or cut thereby. Segments 108, 108 of the cutting portions of each jaw 100, 102 may be flattened near the center (FIG. 7) so that the stem of the fruit may be severed as close to the skin of the fruit as possible.

FIGS. 8 and 9 indicate a baffle arrangement for storing and discharging severed fruit from tube 12. FIG. 8 shows a ball 110 having a diameter at least one-half that of tube 12 secured therein by a removable bolt and nut assembly 112. When the forward end of tube 12 has been filled with picked fruit, tube 12 is lowered and fruit is dumped from the entrance end of the tube into a waiting receptacle (not shown). Alternatively, ball 110 and bolt and nut assembly 12 may be removed to allow each fruit to fall through exit port 114 as it is picked. A baffle or bar 116 is mounted rearwardly in tube 12 to direct fruit through port 114.

In FIG. 9, all fruit picked is allowed to fall through port 114. Therefore, ball 110 is secured in tube 12 rearwardly of port 114.

In the configuration shown in FIG. 1, where the electrical system 16 is mounted on the exterior of the tube, exit end 26 may be blocked by a pivoting pin or bar or by a bolt and nut assembly (not shown) if it is desired to retain picked fruit within tube 12.

I claim:

1. A device for picking fruit by severing the stem thereof comprising:
   a. an elongated tube;
   b. a pair of pivoting, normally open, cutting jaws mounted over one end of the tube; and
   c. actuating means for the pair of jaws comprising:
      1. electric actuating means mechanically connected to the jaws;
      2. electric circuit means for energizing said electric actuating means; and
      3. a normally open contact switch for closing the circuit means, thereby energizing the electric circuit means, the switch being positioned adjacent the jaws so that a fruit will pass between the jaws when open and press against the switch to actuate the circuit, close the jaws, and sever the fruit stem; and
   d. unjamming means in the electric actuating means; and mechanically connected to the electric circuit means, whereby upon failure of the jaws to sever the fruit stem on a first attempt, said unjamming means is actuated to cyclically open and close said circuit means thereby opening and closing said jaws until the fruit stem is severed.

2. The invention as recited in claim 1 wherein mechanical means are provided between the electric actuating means and the jaws, movable substantially parallel to the tube to open and close the jaws, and the unjamming means comprise a circuit breaker, secured to the mechanical means, and arranged to open the electric circuit upon substantial closing of the jaws, and close the electric circuit upon partial reopening of the jaws, all while the normally open contact switch remains closed.

3. The invention as recited in claim 2 wherein the circuit breaker comprises a contact, wired in the electric circuit, normally spring urged to a closed electric circuit position, and an actuator, mounted on the mechanical means, arranged to open the spring urged contact as the jaws close.

4. The invention as recited in claim 3 wherein the actuator is adjustably mounted on the mechanical means so as to open the electric circuit when the jaws are in a plurality of partially closed positions.

5. The invention as recited in claim 1 wherein the electric circuit means further comprises manually operated switch means for overriding the normally open contact switch.

6. The invention as recited in claim 1 wherein the electric circuit means further comprise a gravity operated, safety mercury switch, being positioned to open said electric circuit when the elongated tube is in a substantially horizontal position.

7. The invention as recited in claim 1 wherein the electric circuit means further comprise a transistorized silicon control rectifier adjacent said normally open contact switch whereby the operating life of said contact switch will be extended.

8. The invention as recited in claim 1 wherein each of the pair of jaws comprises a semicircular member, mounted on approximately a diameter of the end of the tube to lie substantially coincident with the circumference of the tube when the jaws are open, and at substantially a right angle to the first position when the jaws are closed, one of the jaws being provided with:
   a. a sharpened portion on its operative face, arranged to mate with the undersurface of the other of said jaws when said jaws are closed; and
   b. a recessed portion on its operative face, arranged to be spaced from said other jaw when the jaws are closed.

9. The invention as recited in claim 8 wherein a segment of the sharpened portion of said one jaw and a mating segment of said other jaw are flattened, substantially along a chord of the semicircular member.

10. A device for picking fruit by severing the stem thereof comprising:
   a. an elongated tube;
   b. a pair of pivoting, semicircular jaws mounted over one end of the tube;
   c. and operating rod to actuate the jaws;
   d. mechanical link means between the rod and the jaws; and
   e. electric means for moving the operating rod including:
      1. solenoid means comprising:
         a. a single winding;
         b. a pair of cores arranged along common axis with said rod, each having means defining a bore therethrough; said rod slidably mounted through one of said cores and fixed to the other of said cores; and
         c. connecting means fixed to said one core and slidable through said other core; said one core being within the field of force of said winding, said other core being outside of the field of force of said winding, whereupon energization of said winding, the first core will move the operating rod and said other core through said connecting means a sufficient distance to allow the other core to be affected by the field of force of the winding, the second core moving the rod an additional distance to close the jaws through the operating rod and the mechanical linking means; and
      2. electric circuit means for energizing said solenoid means.

11. The invention as recited in claim 10 wherein said pair of cores are provided with return spring means, mounted therebetween, for spreading said cores upon deenergization of said solenoid means, thereby opening said jaws through action of said operating rod and mechanical linking means.

12. The invention as recited in claim 10 wherein the electric circuit means include a normally open contact switch, for breaking and closing said electric circuit means, located on the one end of the tube, beneath the jaws when the jaws are in a closed position so that upon contact of an individual fruit with said switch, the circuit is closed to energize the solenoid means causing the rod to close the jaws; through the linking means, over the outer circumference of the individual fruit, and sever the stem.

13. The invention as recited in claim 12 wherein electromechanical unjamming means are wired in the electric circuit means, comprising a circuit breaker; secured to the operating rod and to the tube, being arranged to open the electric circuit upon substantial closing of the jaws, and close the electric circuit upon partial reopening of the jaws, all while the normally open contact switch remains closed.

14. The invention as recited in claim 10 wherein the operating rod is mounted on the tube, substantially paralleled to the long axis of the tube, and the mechanical linking means comprise:
   a. a pair of ears, one on each jaw opposite mating ends thereof; and
   b. a pair of tie rods; one to each ear, both being secured to the free end of the operating rod; whereupon downward movement of the operating rod, said jaws will close and upon upward movement of the operating rod, the jaws will open.

15. The invention as recited in claim 10 wherein said tube comprises at least two separable distinct sections.

16. The invention as recited in claim 10 wherein said tube is lined with resilient, shock absorbent material.

17. The invention as recited in claim 10 wherein said tube includes:
   a. Means defining a fruit exit port in a sidewall of the tube near the end opposite said one end; and
   b. baffle means mounted internally of the tube, adjacent the port, and selectively positionable to retain severed fruit within the tube and direct severed fruit through the exit port.

18. The invention as recited in claim 17 wherein said baffle means comprise:
   a. a ball, having a diameter at least equal to one-half the diameter of the tube; and
   b. means insertable laterally through said sidewall of the tube to retain the ball in position.